United States Patent
Inoue

(10) Patent No.: US 8,888,031 B2
(45) Date of Patent: Nov. 18, 2014

(54) METHOD OF DERIVING PATH OF CONTACT ON FACE GEAR, METHOD OF MANUFACTURING FACE GEAR, FACE GEAR AND SPINNING REEL ROTOR DRIVE DEVICE

(75) Inventor: Tetsuo Inoue, Osaka (JP)

(73) Assignee: Shimano Inc., Osaka (JP)

( * ) Notice: Subject to any disclaimer, the term of this patent is extended or adjusted under 35 U.S.C. 154(b) by 480 days.

(21) Appl. No.: 13/271,906

(22) Filed: Oct. 12, 2011

(65) Prior Publication Data

US 2012/0097779 A1 Apr. 26, 2012

(30) Foreign Application Priority Data

Oct. 21, 2010 (JP) ................................. 2010-236667

(51) Int. Cl.
  *A01K 89/01* (2006.01)
  *F16H 55/17* (2006.01)
  *F16H 1/26* (2006.01)
  *F16H 57/022* (2012.01)
  *F16H 57/00* (2012.01)

(52) U.S. Cl.
  CPC ................. *A01K 89/01* (2013.01); *F16H 55/17* (2013.01); *F16H 1/26* (2013.01); *F16H 57/022* (2013.01); *F16H 2055/173* (2013.01); *F16H 2057/0087* (2013.01)
  USPC ....................................................... 242/249

(58) Field of Classification Search
  CPC ........... A01K 89/015; F16H 1/12; F16H 1/26; F16H 55/0846; F16H 55/0853; F16H 2055/173; F16H 57/022
  USPC .................................................. 242/249, 311
  See application file for complete search history.

(56) References Cited

U.S. PATENT DOCUMENTS 2,409,999 A * 10/1946 Miller ........................... 425/579
2,969,177 A * 1/1961 Gubelmann ................ 235/63 K
(Continued)

FOREIGN PATENT DOCUMENTS

GB           513239       * 10/1939
JP      2000-166437 A        6/2000
(Continued)

OTHER PUBLICATIONS

Extended European Search Report of the corresponding European Application No. 11186090.4, dated Oct. 16, 2012.
(Continued)

*Primary Examiner* — Emmanuel M Marcelo
(74) *Attorney, Agent, or Firm* — Global IP Counselors

(57) ABSTRACT

A method of deriving a path of contact of a face gear with a pinion gear includes positioning the pinion gear, shifting the pinion gear from either towards or away from the face gear along a rotational axis, deriving a first relationship between a rotational angle of the pinion gear and a fluctuation error angle, deriving second and third relationship by shifting the first relationship in either way for 360 degree divided by the number of the gear teeth, deriving a first point which the first and second relationships share and a second point which the first and third relationships share, deriving a third point, at which the fluctuation error is the same as the first and second points, between the first and second points, and determining a curve line on tooth flanks of the gear teeth on the basis of the first, second, and third points.

6 Claims, 19 Drawing Sheets

(56) References Cited

U.S. PATENT DOCUMENTS

| | | | |
|---|---|---|---|
| 3,591,109 A * | 7/1971 | McLarty | 244/17.23 |
| 5,116,173 A * | 5/1992 | Goldrich | 409/13 |
| 5,570,633 A * | 11/1996 | Schultz et al. | 101/182 |
| 6,112,611 A | 9/2000 | Maki | |
| 8,573,087 B2 * | 11/2013 | Stadtfeld | 74/416 |
| 2011/0209573 A1 * | 9/2011 | Stadtfeld | 74/413 |
| 2012/0097779 A1 * | 4/2012 | Inoue | 242/249 |

FOREIGN PATENT DOCUMENTS

| | | |
|---|---|---|
| JP | 2007-259713 A | 10/2007 |
| JP | 2010-075075 A | 4/2010 |
| WO | WO 9612585 * | 10/1995 |
| WO | WO-0054569 A1 | 9/2000 |
| WO | WO 03095128 A1 * | 5/2003 |

OTHER PUBLICATIONS

Litvin et al., "Computerized Design and Generation of Modified Spiroid Worm-Gear Drive with Low Transmission Errors and Stabilized Bearing Contact", Computer Methods in Applied Mechanics and Engineering, Aug. 25, 1998, pp. 187-201, vol. 162, No. 1-04, North-Holland, Amsterdam, NL.

* cited by examiner

|   | FACTORS | LEVEL 1 | LEVEL 2 | LEVEL 3 |
|---|---|---|---|---|
| A | HEIGHT ERROR | ∆− | 0 | ∆+ |
| B | OFFSET ERROR | ∆− | 0 | ∆+ |
| C | TILT AXIS ERROR | ∆+ | 0 | ∆− |
| D |   |   |   |   |

FIG. 16

METHOD OF DERIVING PATH OF CONTACT ON FACE GEAR, METHOD OF MANUFACTURING FACE GEAR, FACE GEAR AND SPINNING REEL ROTOR DRIVE DEVICE

CROSS-REFERENCE TO RELATED APPLICATIONS

This application claims priority to Japanese Patent Application No. 2010-236667 filed on Oct. 21, 2010. The entirety disclosure of Japanese Patent Application No. 2010-236667 is hereby incorporated herein by reference.

BACKGROUND OF THE INVENTION

1. Field of the Invention

The present invention is related to a method of deriving a path of contact on a face gear using a face gear having a plurality of gear teeth and a pinion gear meshing with the face gear, a method of manufacturing a face gear, a face gear and a spinning reel rotor drive device.

2. Background Art

The spinning reels are generally structured under the condition that a handle shaft and a rotor are respectively disposed about axes skew to each other. Therefore, a rotor drive mechanism includes a face gear and a pinion gear with helical gear teeth for transmitting rotation of a handle to the rotor. The face gear includes gear teeth formed by cutting a disc using a cutting tool that has the same shape as the pinion gear with the helical gear teeth. Accordingly, anglers feel that the handle is smoothly rotated (the angler's feeling with respect to the handle rotation will be hereinafter referred to as "rotational feeling").

Japan Laid-open Patent Application Publication No. JP-A-2010-075075 describes an exemplary well-known face gear to be produced by die-forming using a die on which an original face gear produced by cutting is transferred. This realizes mass production of the face gears and reduction in production cost of the face gears.

SUMMARY

As is the case with the face gear produced by die forming, the face gear is not uniformly rotated with respect to the pinion gear when the face gear and the pinion gear are even slightly misaligned from a reference contact position in assembling the rotor drive mechanism. Non-uniform rotation of the face gear results in unsmooth rotation of the handle and this can deteriorate rotational feeling. Therefore, it takes tremendous time for assembling and adjusting the rotor drive mechanism.

The present invention addresses a need to produce a face gear prevented from non-uniformly rotating as much as possible even when an error is produced in its assembly dimension.

A method of deriving a path of contact of a face gear including a plurality of gear teeth in meshing with a pinion gear is provided. The method includes positioning the pinion gear for meshing with the face gear at a prescribed reference contact position, shifting the pinion gear from the reference contact position either towards or away from the face gear along a rotational axis of the face gear, deriving a first relationship between a rotational angle of the pinion gear and a fluctuation error of a rotational angle of the face gear, deriving a second relationship between the rotational angle of the pinion gear and the fluctuation error by shifting the first relationship by subtracting from the rotational angle an angle of 360 degree divided by the number of the gear teeth, deriving a third relationship between the rotational angle of the pinion gear and the fluctuation error by shifting the first relationship by adding to the rotational angle the angle of 360 degree divided by the number of the gear teeth, deriving a first point which the first and second relationships share and a second point which the first and third relationships share wherein the first point has a first fluctuation error and the second point has the firs fluctuation error, deriving a third point, which has the fluctuation error, between the first and second points, and determining a curve line connecting a first contact position, a second contact position, and a third contact position as the path of contact on tooth flanks of the gear teeth of the face gear. The first contact position is set as a contact position of the pinion gear and corresponds to the first point. The second contact position is set as a contact position of the pinion gear and corresponds to the second point. The third contact position is set as a contact position of the pinion gear and corresponds to the third point when the face gear is rotated for an angle for the rotational error.

BRIEF DESCRIPTION OF THE DRAWINGS

Referring now to the attached drawings which form a part of this original disclosure:

FIG. 16 is an allocation table representing an exemplary method of simulating production of rotational errors due to the alignment errors;

DETAILED DESCRIPTION OF THE EMBODIMENTS

Spinning Reel Structure

Figure 1:
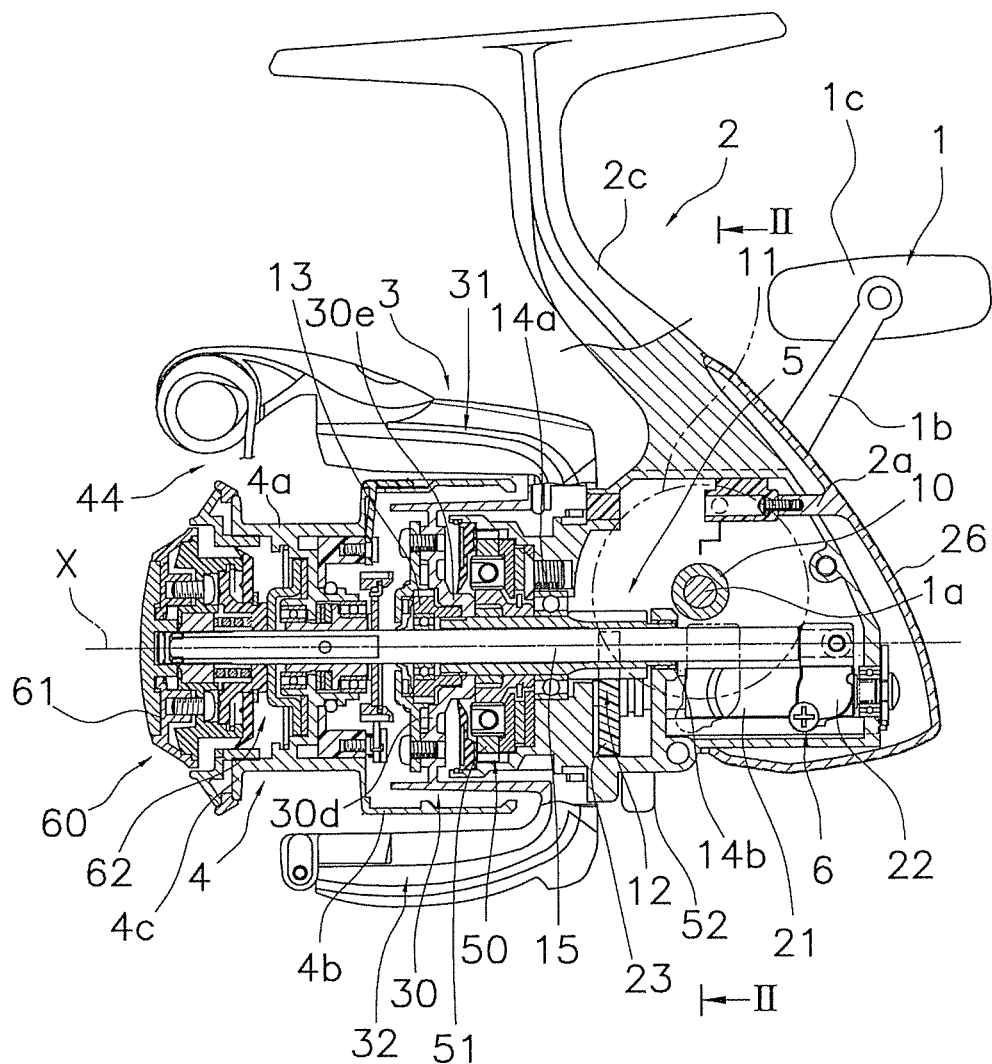
FIG. 1 is a cross-sectional side view of a spinning reel adopting an exemplary embodiment of the present invention.

As illustrated in FIG. 1, a spinning reel adopting an exemplary embodiment of the present invention includes a handle 1, a reel unit 2, a rotor 3, and a spool 4. The reel unit 2 supports the handle 1 while allowing the handle 1 to rotate. The rotor 3 is supported at the front of the reel unit 2. The spool 4 is configured to wind a fishing line onto the outer peripheral surface thereof. The spool 4 is disposed at the front of the rotor 3 while being movable back and forth. It should be noted that the handle 1 is attachable to either the right side or the left side of the reel unit 2.

Figure 2:
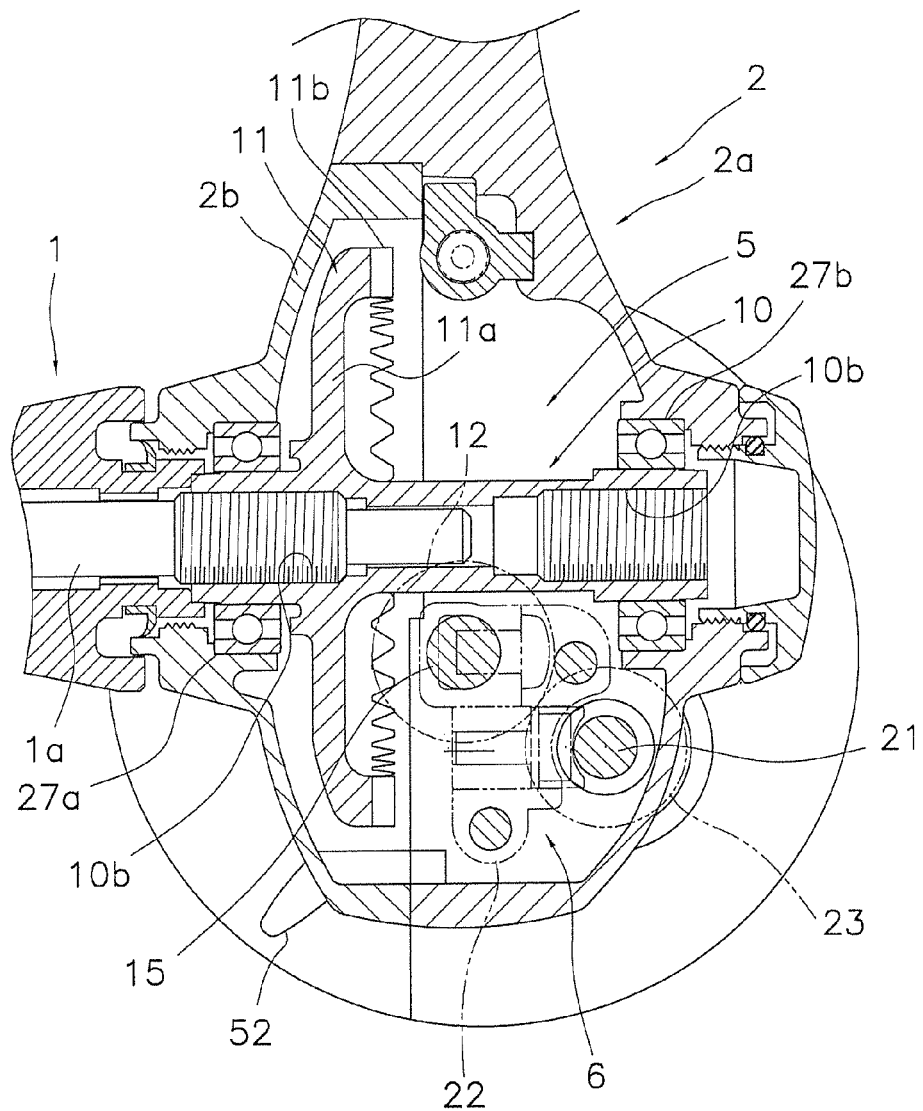
FIG. 2 is a cross-sectional rear view of the spinning reel of FIG. 1 sectioned along a line II-II.

As illustrated in FIGS. 1 and 2, the handle 1 includes a handle shaft 1a, a handle arm 1b, and a handle knob 1c. The handle arm 1b extends from the handle shaft 1a in the radial direction of the handle shaft 1a. The handle knob 1c is rotatably attached to the extended end of the handle arm 1b.

As illustrated in FIGS. 1 and 2, the reel unit 2 includes a reel body 2a and a lib member 2b (see FIG. 2). The reel body 2a includes a laterally opened accommodation space in the inside thereof. The lid member 2b is detachably attached to the reel body 2a for covering the opening of the accommodation space. Further, the reel unit 2 includes a reel unit guard 26 for covering the rear part of the reel body 2a and that of the lid member 2b.

The reel body 2a is made of light metal alloy such as magnesium alloy or aluminum alloy. Further, the reel body 2a includes a fishing rod attachment leg 2c integrally formed on the top thereof. The fishing rod attachment leg 2c is formed in a T-shape while the top thereof extends back and forth. Further, the reel body 2a accommodates a rotor drive mechanism 5 and an oscillation mechanism 6 in the accommodation space as illustrated in FIG. 1.

Figure 3:
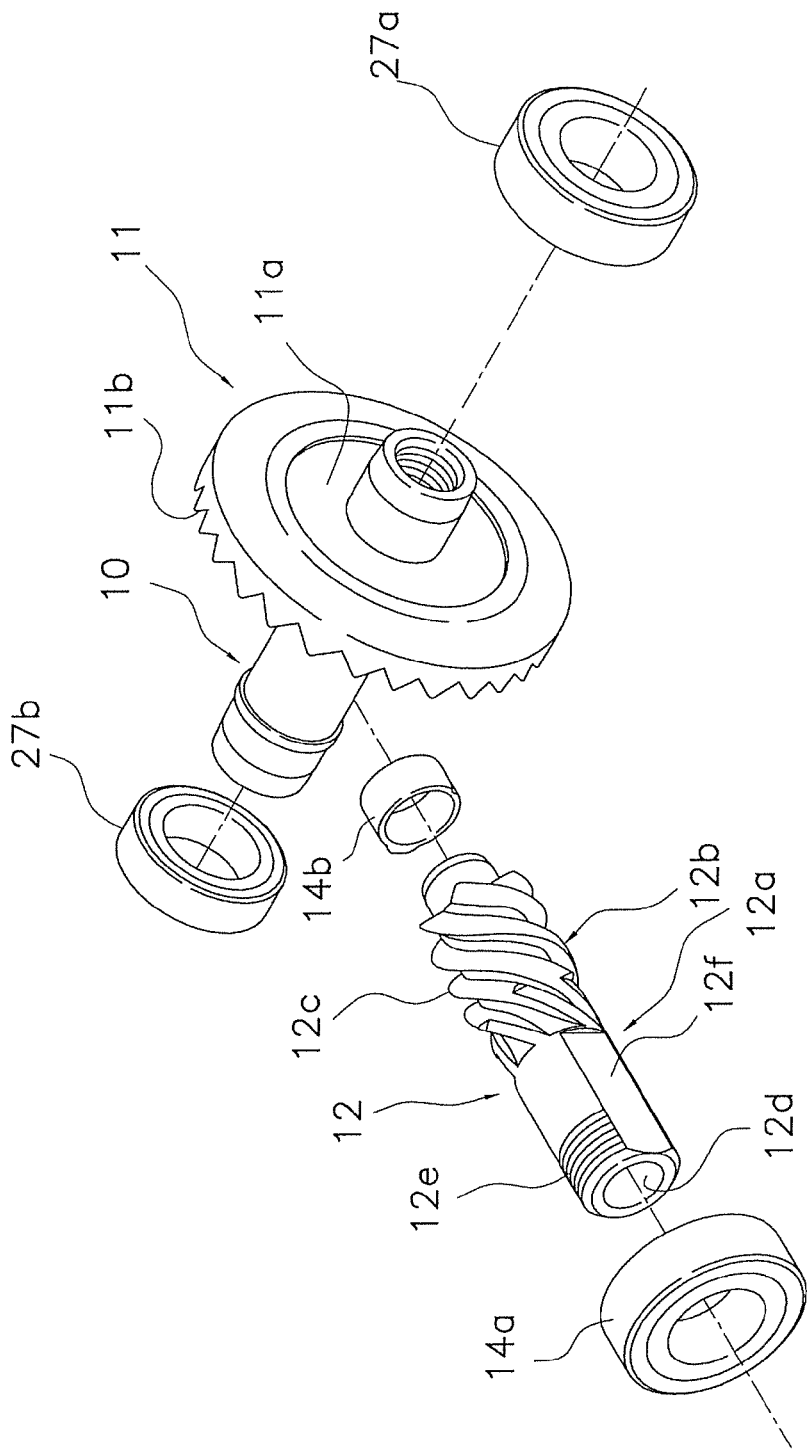
FIG. 3 is an exploded perspective view of a rotor drive mechanism.

The rotor drive mechanism 5 (an example of a rotor drive device) is configured to rotate the rotor 3 in conjunction with rotation of the handle 1 for transmitting rotation of the handle 1 to the rotor 3. As illustrated in FIGS. 2 and 3, the rotor drive mechanism 5 includes a face gear 11 and a pinion gear 12. The face gear 11 is configured to rotate together with a face gear shaft 10 coupled to the handle shaft 1a of the handle 1 in a unitarily rotatable state. The pinion gear 12 meshes with the face gear 11.

In the present exemplary embodiment, the face gear 11 is formed integrally with the face gear shaft 10 as illustrated in FIG. 2. However, the face gear 11 can be alternatively formed separately from the face gear shaft 10. In the present exemplary embodiment, the face gear shaft 10 is screwed and coupled onto the handle shaft 1a in a unitarily rotatable state. However, the face gear shaft 10 can be alternatively coupled onto the handle shaft 1a in a unitarily rotatable state while a non-circular cross-sectional part of the face gear shaft 10 is engaged with that of the handle shaft 1a. The face gear shaft 10 is rotatably attached to the reel unit 2 through bearings 27a and 27b. The bearing 27a is attached to the lid member 2b, whereas the bearing 27b is attached to the reel body 2a. The face gear shaft 10 includes a left female threaded portion 10a and a right female threaded portion 10b on the inner peripheral surfaces of the both ends thereof. Either the left female threaded portion 10a or the right female threaded portion 10b is allowed to be screwed onto the handle shaft 1a. Specifically, the left female threaded portion 10a, which is disposed closer to the face gear 11, is a left-handed screw, whereas the right female threaded portion 10b, disposed away from the face gear 11, is a right-handed screw. In other words, the handle shaft 1a is herein prepared to be used as either the right-handed screw or the left-handed screw.

Figure 4:
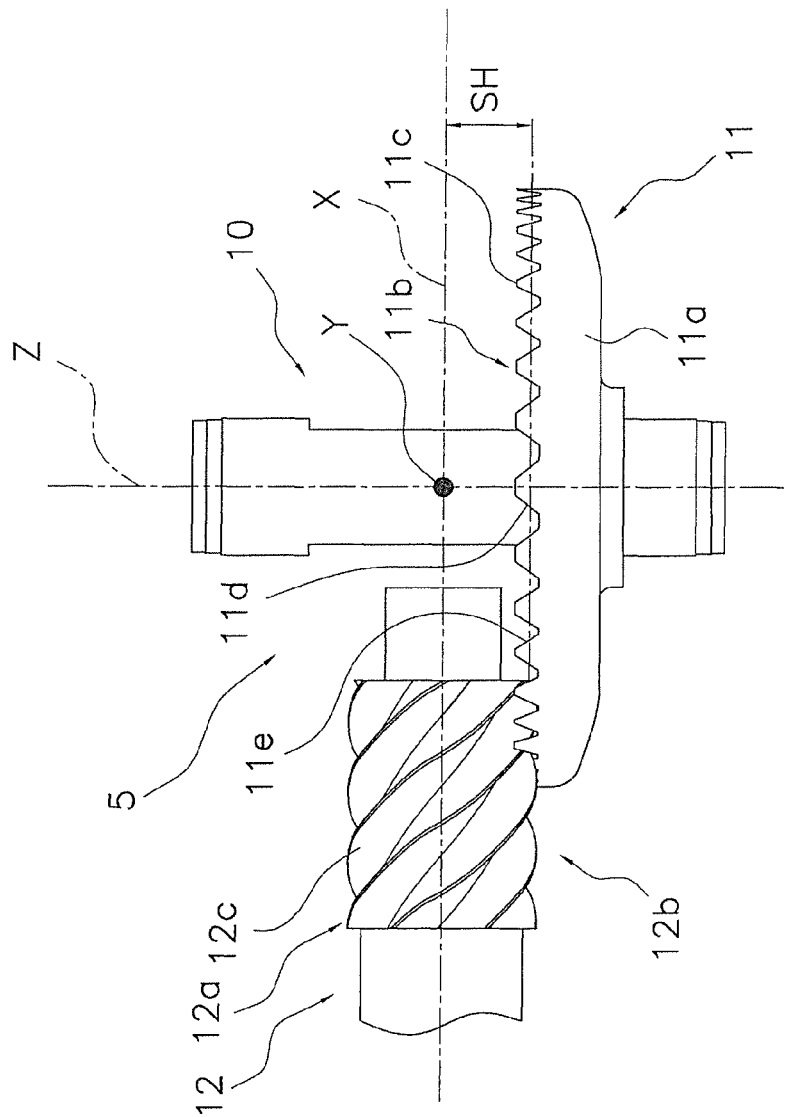
FIG. 4 is a plan view of the rotor drive mechanism.
Figure 15:
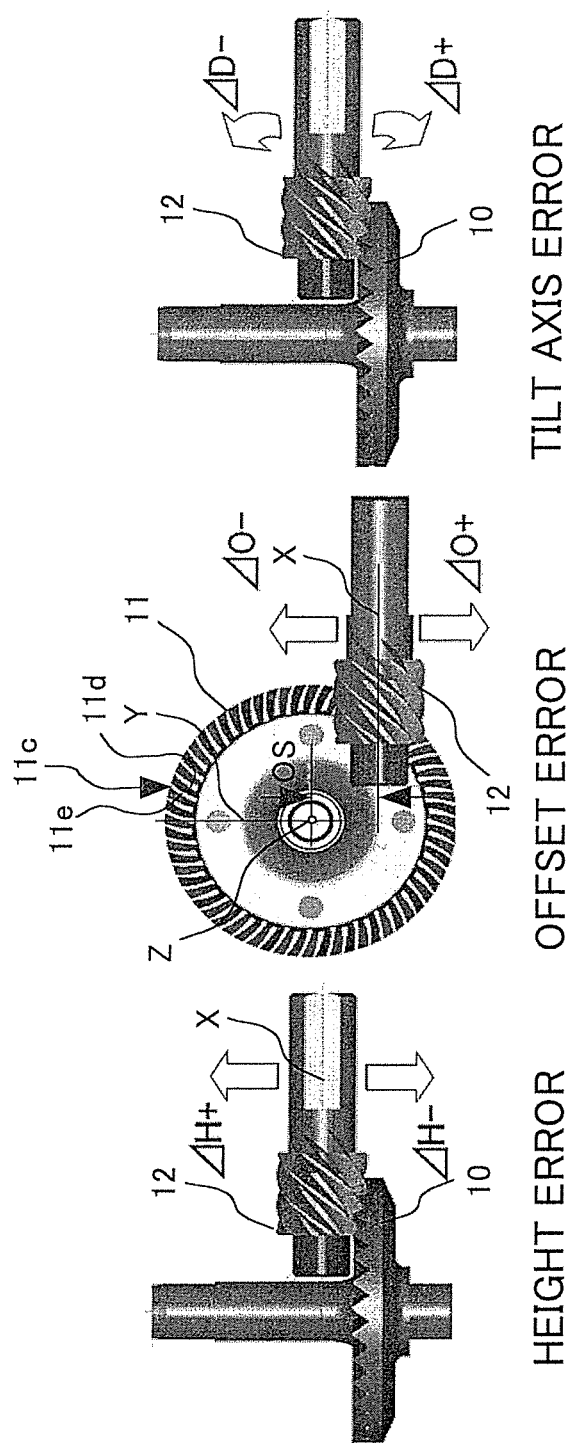
FIG. 15 is a diagram for explaining three alignment errors and directions thereof.

As illustrated in FIGS. 2, 3 and 4, the face gear 11 includes a disc portion 11a and a face gear portion 11b. The disc portion 11a is integrally formed with the face gear shaft 10. The face gear portion 11b is formed on the outer radial part of one of the faces of the disc portion 11a. The face gear portion 11b includes a plurality of face gear teeth 11c circumferentially aligned at predetermined intervals on the outer radial part of the aforementioned face of the disc portion 11a. The face gear 11, together with the face gear shaft 10, is formed by forging of aluminum alloy for example. As illustrated in FIG. 4, each of the face gear teeth 11c includes a first tooth flank 11d and a second tooth flank 11e. The first tooth flank 11d is configured to be meshed with the pinion gear 12 when the handle 1 is rotated in the fishing-line winding direction. The second tooth flank 11e is configured to be meshed with the pinion gear 12 when the handle 1 is rotated in the fishing-line releasing direction. At least the first tooth flank 11d is formed along a path of contact to be derived by a path-of-contact deriving method to be described. As illustrated in FIG. 15, each first tooth flank 11d is formed as a coast (i.e., a concave surface) and a center part of the first tooth flank 11d in the tooth trace direction is recessed, whereas the second tooth flank 11e is formed as a drive (i.e., a convex surface) that its center part in the tooth trace direction protrudes.

The pinion gear 12 includes a tubular gear body 12a and a gear portion 12b. The gear portion 12b includes helical teeth 12c formed on the outer peripheral surface of the rear part of the gear body 12a. The gear body 12a is attached to the reel body 2a while being rotatable about an axis (i.e., a spool shaft 15) arranged skew to the handle shaft 1a. The gear body 12a is rotatably supported by the reel body 2a through a front bearing 14a and a rear bearing 14b. The front bearing 14a is herein disposed forward of the gear portion 12b, whereas the rear bearing 14b is disposed rearward of the gear portion 12b. The gear body 12a includes a through hole 12d in the center thereof for allowing the spool shaft 15 to penetrate therethrough. The gear body 12a includes a male threaded portion 12e on the outer peripheral surface of the front end thereof. A nut 13 is screwed onto the male threaded portion 12e for fixing the rotor 3. The gear body 12a further includes a pair of anti-rotation planes 12f on the outer peripheral surface of the front part thereof. The anti-rotation planes 12f are parallel planes used for coupling the rotor 3 onto the pinion gear 12 in a unitarily rotatable state.

The pinion gear 12 is designed to be meshed with the face gear 11 at a reference contact height SH (an example of a reference contact position of the pinion gear 12 with respect to the face gear 11). As illustrated in FIG. 15, the pinion gear 12 is displaced from the rotational center Z of the face gear 11 by a reference offset amount OS. The pitch circle of the face gear 11 is arranged closer to the roots of the face gear teeth 11c from the tips of the face gear teeth 11c by the addendum of the pinion gear 12 (calculated by (outside diameter−pitch circle diameter)/2), i.e., the distance from the tops of the helical teeth 12c to the pitch circle diameter of the pinion gear 12. Therefore, the pitch circle of the pinion gear 12 and the pitch circle of the face gear 11 are matched at the reference contact height SH. The reference offset amount OS is defined as the distance from the rotational center Z of the face gear 11 to the rotational center X of the pinion gear 12, as illustrated in FIG. 15.

As illustrated in FIGS. 1 and 2, the oscillation mechanism 6 is configured to move back and forth the spool shaft 15 coupled to the center part of the spool 4 through a drag mechanism 60 for moving the spool 4 in the same direction as the spool shaft 15. The oscillation mechanism 6 includes a traverse cam shaft 21, a slider 22 and an intermediate gear 23. The traverse cam shaft 21 is disposed below and in parallel to the spool shaft 15. The slider 22 is guided by the reel body 2*a* while being movable back and forth along the traverse cam shaft 21. The intermediate gear 23 is fixed to the tip of the traverse cam shaft 21. The rear end of the spool shaft 15 is fixed to the slider 22 while being prevented from rotating. The intermediate gear 23 is meshed with the pinion gear 12.

The rotor 3 is made of light alloy such as magnesium alloy or aluminum alloy. As illustrated in FIG. 1, the rotor 3 is coupled with the pinion gear 12 while being prevented from rotating. However, the rotor 3 is rotatable with respect to the reel unit 2. The rotor 3 includes a tubular portion 30, a first rotor arm 31, and a second rotor arm 32. The tubular portion 30 is coupled with the pinion gear 12 in a unitarily rotatable state. The first and second rotor arms 31 and 32 are connected to the rear part of the tubular portion 30 while being opposed to each other. Each of the first and second rotor arms 31 and 32 is forwardly extended at an interval from the tubular portion 30.

The tubular portion 30 includes a disc-shaped wall portion 30*d* on the inner peripheral side of the front part thereof. The wall portion 30*d* includes an annular boss 30*e* in the center part thereof. The boss 30*e* is coupled to the pinion gear 12 in a unitarily rotatable state. The front part of the pinion gear 12 penetrates through the inner periphery of the boss 30*e* while the anti-rotation planes 12*f* formed on the front part of the pinion gear 12 are fitted onto the inner peripheral surface of the boss 30*e* in a unitarily rotatable state. Under the condition, the nut 13 is screwed onto the male threaded portion 12*e* of the pinion gear 12. The rotor 3 is thereby fixed to the pinion gear 12. A bail arm 44 is attached to the outer peripheral side of the tip of the first rotor arm 31 for guiding the fishing line to the spool 4 while being pivotable between a fishing-line releasing position and a fishing-line winding position.

The rotor 3 accommodates an anti-rotation mechanism 50 in the inside of the tubular portion 30 thereof. The anti-rotation mechanism 50 is configured to prevent or allow reverse rotation of the rotor 3. The anti-reverse mechanism 50 includes a one-way clutch 51 and a switching lever 52. The one-way clutch 51 is a roller-type one-way clutch that an inner race is allowed to freely rotate. The switching lever 52 is configured to switch the one-way clutch 51 between an activated state (i.e., an anti-reverse rotational state) and a deactivated state (i.e., a reverse rotational state). The switching lever 52 is pivotably attached to the reel body 2*a*. A cam (not illustrated in the figures) is disposed on the tip of the switching lever 52. When the switching lever 52 is pivoted, the cam switches the one-way clutch 51 between the activated state and the deactivated state.

As illustrated in FIG. 1, the spool 4 is attached onto the tip of the spool shaft 15 through the drag mechanism 60 while being disposed between the first and second rotor arms 31 and 32 of the rotor 3. The spool 4 includes a bobbin trunk 4*a*, a skirt 4*b*, and a flange 4*c*. The bobbin trunk 4*a* is a portion for winding the fishing line about the outer periphery thereof. The skirt 4*b* is a tubular portion extended rearward from the bobbin trunk 4*a*. The skirt 4*b* is herein integrally formed with the bobbin trunk 4*a*. The flange 4*c* is a large diameter portion disposed on the front end of the bobbin trunk 4*a*.

The drag mechanism 60 is configured to brake rotation of the spool 4. The drag mechanism 60 includes a drag regulation knob 61 and a brake portion 62. The drag regulation knob 61 is screwed onto the tip of the spool shaft 15. The brake portion 62 is configured to brake the spool 4 when being pressed by the drag regulation knob 61.

In the above structured spinning reel, when an angler rotates the handle 1 in the fishing-line winding direction while the bail arm 44 is set to be in the fishing-line guiding position, the face gear 11 is configured to be rotated in conjunction with rotation of the handle 1 and the pinion gear 12 meshing with the face gear 11 is further rotated. The rotor 3 is thereby rotated in the fishing-line winding direction and the released fishing line is wound about the spool 4. The first tooth flanks 11*d* of the face gear teeth 11*c* of the face gear 11 are determined by a method of deriving a path of contact. Therefore, chances of unsmooth rotation of the handle 1 are reduced even when an error is produced in assembling the rotor drive mechanism 5.

Method of Deriving Path of Contact on Face Gear

The following explanation is related to steps in a method of deriving a path of contact on a face gear according to an exemplary embodiment of the present invention. The steps will be hereinafter explained with reference to a flowchart represented in FIG. 5. The method of deriving a path of contact on the face gear 11 includes a positioning step (Step S1), a curve creating step (Step S2), a curve positioning step (Step S3), a first coordinate calculating step (Step S4), a line calculating step (Step S5), a second coordinate calculating step (Step S6), an error calculating step (Step S7) and a determining step (Step S8). The respective steps are configured to be executed by a simulation processing using an electronic computer, such as a three-dimensional (3D) computer aided design (hereinafter simply referred to as CAD).

First, the specifications of the face gear 11 and the pinion gear 12 are set prior to execution of the method of deriving a path of contact on the face gear 11 by the simulation processing. In the present exemplary embodiment, the specification of the pinion gear 12 is set as follows: a module of 0.65 mm; a pressure angle of 20; a teeth number of 6; an addendum modification coefficient of +0.5; and a torsion angle of 55 degrees.

On the other hand, the specification of the face gear 11 is set as follows: a teeth number of 31; an outside diameter of 25.9 mm; an inside diameter of 21.4 mm; a reference offset (OS) of 6.5 mm; and a reference contact height (SH) of 3.725 mm.

Figure 5:
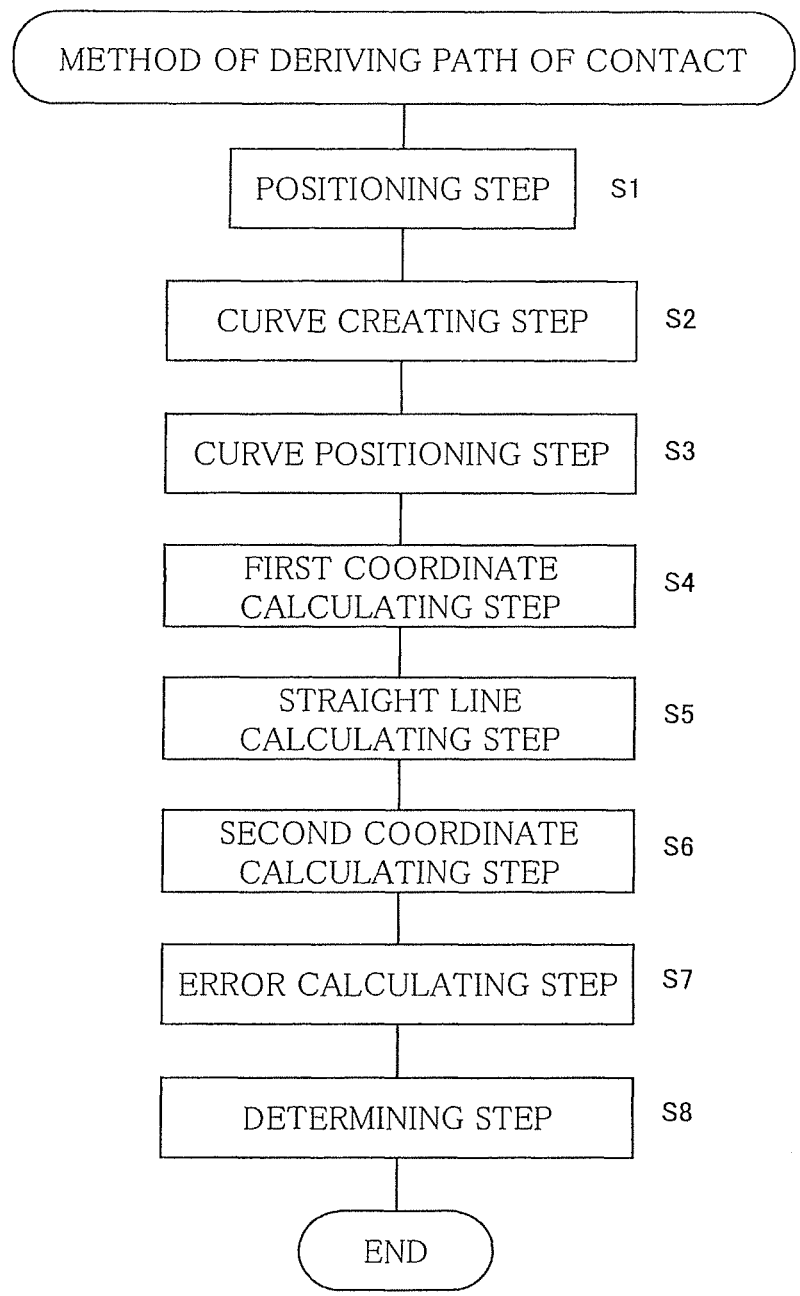
FIG. 5 is a flowchart representing a method of deriving a path of contact.

When the specification of the face gear 11 is set, the pinion gear 12 is positioned to be in either a deep meshing state or a shallow meshing state in the positioning step (Step S1 in FIG. 5). The deep meshing state herein refers to a state that the pinion gear 12 is engaged with the face gear 11 at a position closer to the face gear 11 than the position at the reference contact height SH. In contrast, the shallow meshing state refers to a state that the pinion gear 12 is engaged with the face gear 11 at a position away from the face gear 11 than the position at the reference contact height SH. In FIG. 15, a direction ΔH− indicates the direction for positioning the pinion gear 12 closer to the face gear 11 than the position at the reference contact height SH, whereas a direction ΔH+ indicates the direction for positioning the pinion gear 12 away from the face gear 11 than the position at the contact height SH.

FIG. 4 illustrates a contact state between the pinion gear 12 and the face gear 11. It is empirically understood that gear noise largely varies when the pinion gear 12 is shifted along a third axis Z in FIG. 4 and non-uniform rotation is thereby caused.

Figure 6:
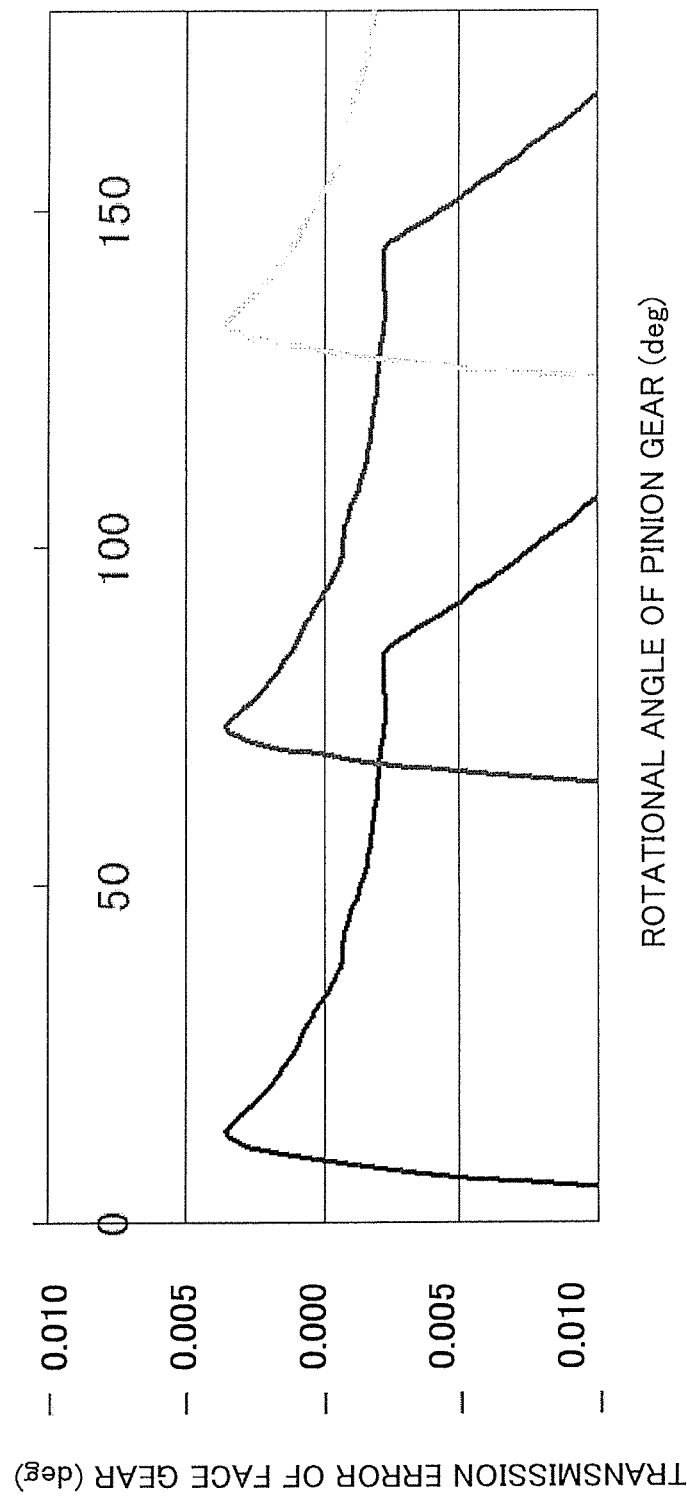
FIG. 6 is a chart representing an exemplary motion curve (relationship) in a shallow meshing state.
Figure 7:
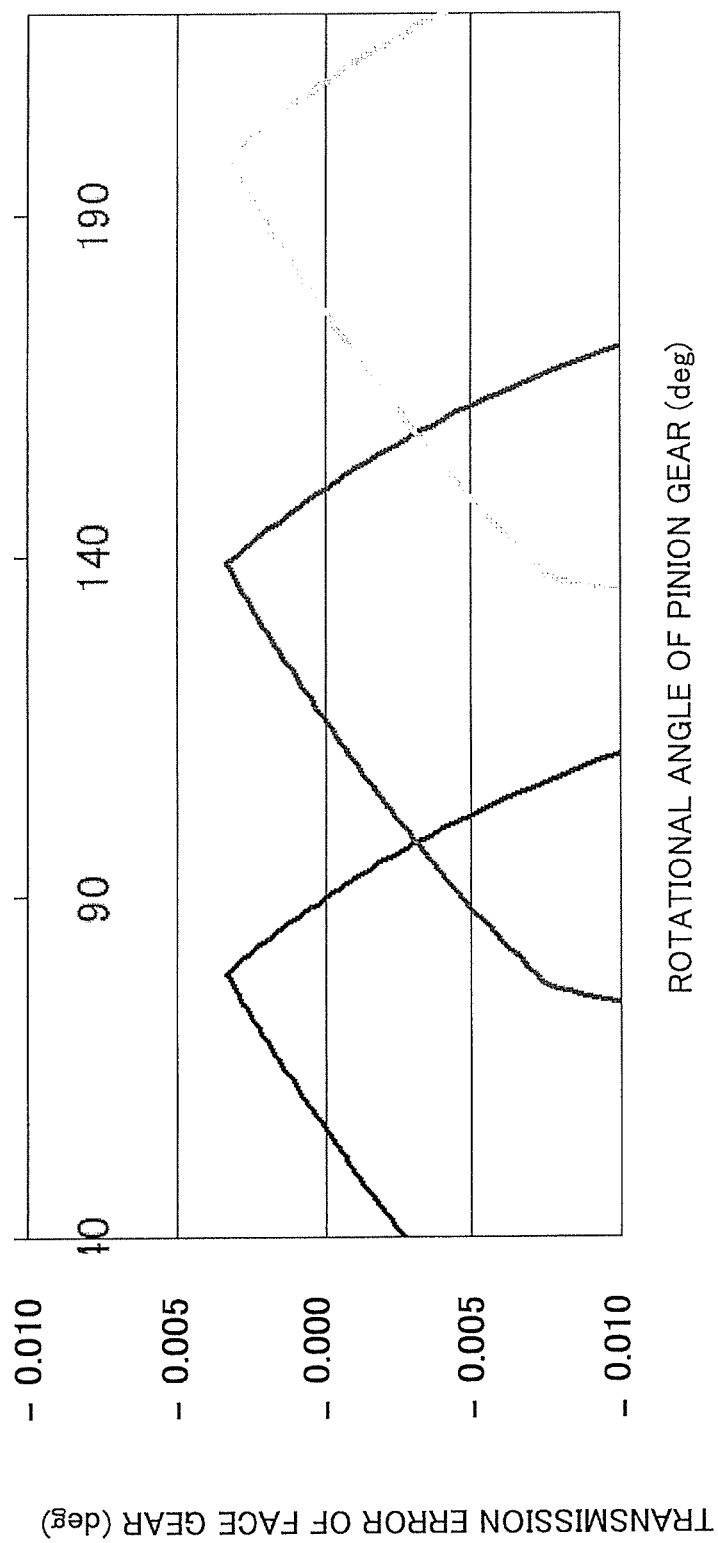
FIG. 7 is a chart representing an exemplary motion curve (relationship) in a deep meshing state.

In the curve creating step (Step S2), a motion curve (relationship) is created by the simulation based on the empirical rule as represented in FIGS. 6 and 7. The motion curve is plotted on a chart where the vertical axis represents a rotational error (hereinafter referred to as "a transmission error") of the face gear 11 and the horizontal axis represents a rotation angle of the pinion gear 12. Specifically, the motion curve indicates how rotation of the face gear 11 deviates from rotation of the pinion gear 12 when the pinion gear 12 is rotated at a constant speed by the amount of a single tooth of the face gear 11. In the simulation, the pinion gear 12 assumed in the CAD is rotated at a constant speed in the fishing-line winding direction, and the transmission error of the face gear 11 is calculated at intervals of a predetermined rotational angle of the pinion gear 12. The transmission error of the face gear 11 is herein set as a fluctuation error between the actual rotational angle of the face gear 11 and the rotational angle of the face gear 11 at a constant speed calculated based on a gear ratio. Then, the motion curve is created by plotting thus calculated transmission error on a chart. FIG. 6 represents a motion curve (relationship) in the shallow meshing state, whereas FIG. 7 represents a motion curve (relationship) in the deep meshing state. The both charts indicate that the transmission error of the face gear 11 largely varies with respect to the rotational speed of the pinion gear 12 when the pinion gear 12 is shifted along the third axis Z. Normally, the motion curve is shaped as a flat-top trapezoid in the reference contact position SH.

Figure 8:
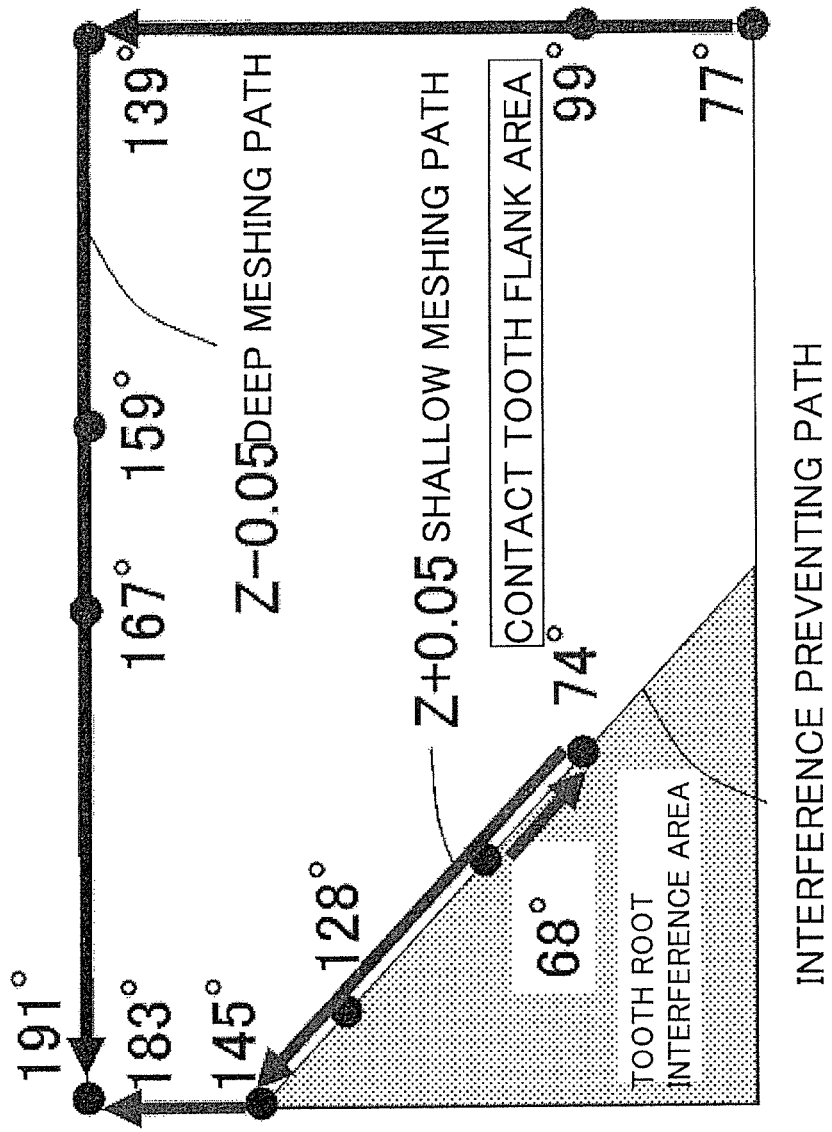
FIG. 8 is a schematic diagram representing a contact path of a pinion gear on face gear tooth flanks.

A trajectory of contact points between the pinion gear 12 and the face gear 11 when the pinion gear 12 is shifted by Δ+ along the third axis Z is herein referred to as a shallow meshing path. In contrast, a trajectory of contact points between the pinion gear 12 and the face gear 11 when the pinion gear 12 is shifted by Δ- along the third axis Z is herein referred to as a deep meshing path. FIG. 8 is a chart obtained by matching the charts of the motion curves in FIGS. 6 and 7 and the contact positions. In FIG. 8, the pinion gear 12 is shifted from the reference contact height SH by +0.05 mm along the third axis Z for producing the shallow meshing path, whereas the pinion gear 12 is shifted from the reference contact height SH by −0.05 mm along the third axis Z for producing the deep meshing path. Based on the correspondence, it can be predicted that the motion curve depends on the tooth flank shape of the face gear teeth 11c of the face gear 11. Simply put, it can be detected that the pinion gear 12 makes contact with the outer edges of the face gear teeth 11c of the face gear 11 in the deep meshing state, whereas the pinion gear 12 makes contact with the inner edge portions (including an interference preventing path) of the face gear teeth 11c of the face gear 11 in the shallow meshing state. It should be noted that the interference preventing path represented in FIG. 8 is a boundary between a contact tooth flank area and a tooth root interference area between the face gear teeth 11c and the pinion gear 12.

In the curve positioning step (Step S3), two motion curves (relationships) are additionally produced by horizontally shifting the aforementioned motion curve obtained by rotating the pinion gear 12 at a constant speed by the amount of a single tooth of the face gear 11. Accordingly, three motion curves are aligned. Specifically, the motion curve is shifted along the horizontal axis by a rotational angle obtained by dividing 360 by the number of teeth of the pinion gear 12 (e.g., 6). In the present exemplary embodiment, three motion curves (relationships) are thus aligned while being displaced at an angle of 60 degrees as represented in FIGS. 6 and 7. The configuration shows the relation between the rotational angle of the pinion gear 12 and the transmission error of the face gear 11 with respect to three consecutive face gear teeth 11c of the face gear 11.

Figure 9:
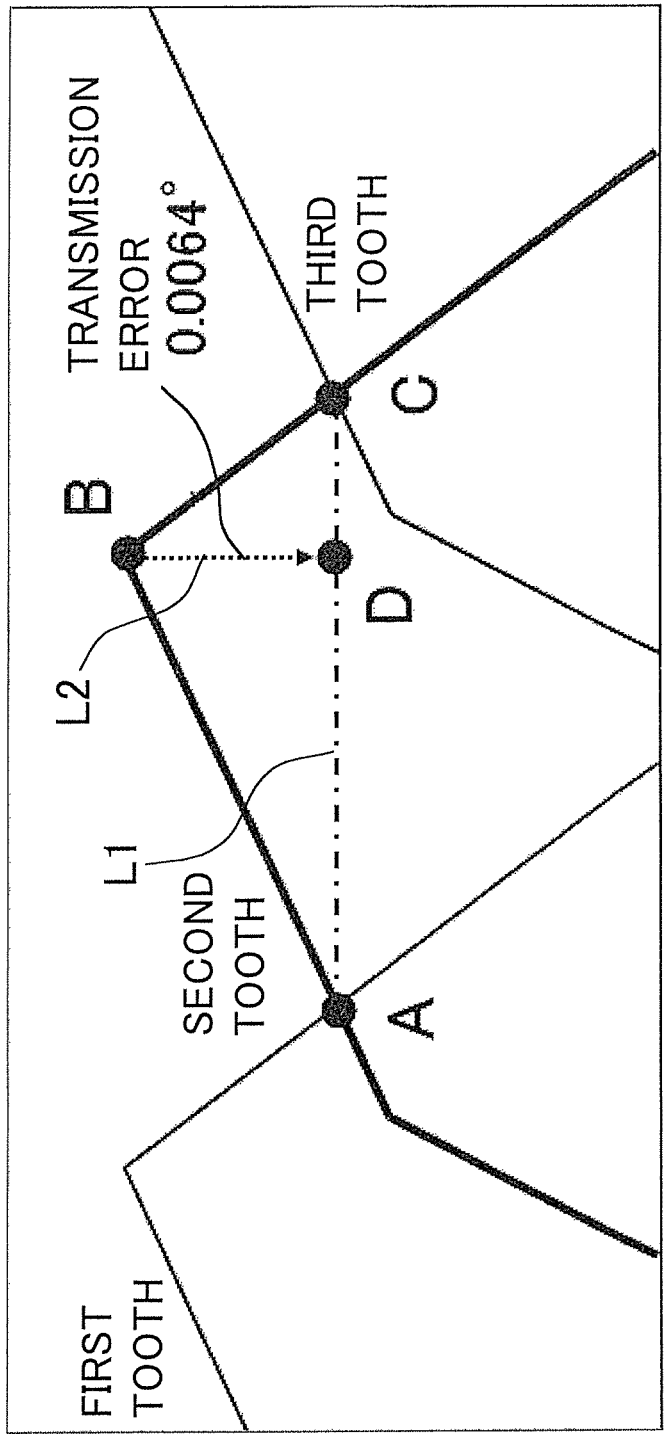
FIG. 9 is a schematic diagram for explaining steps including a positioning step of the motion curves.

In the first coordinate calculating step (Step S4), intersections among the three motion curves thus positioned are calculated from the 3D CAD data, for instance, in FIG. 9 that schematically represents the motion curves in the deep meshing state. In the chart of FIG. 9, the left, center and right motion curves are respectively referred to as a first tooth motion curve (an example of one of second motion curves), a second tooth motion curve (an example of a first motion curve) and a third tooth motion curve (an example of the other of the second motion curves). In Step S4, a first intersection A between the first tooth motion curve and the second tooth motion curve and a second intersection C between the second tooth motion curve and the third tooth motion curve are calculated from the 3D CAD data.

In the straight line calculating step (Step S5), a first straight line L1 connecting the first intersection A and the second intersection C is calculated from the 3D data. A path of contact herein derived makes it possible to produce the tooth flanks for making the motion curve closer to the first straight line L1.

In the second coordinate calculating step (Step S6), the coordinate of a third intersection D is calculated from the 3D data. The third intersection D is an intersection between the first straight line L1 and a second straight line L2. The second straight line L2 is perpendicularly extended to the first straight line L1 from an error position B arranged between the first intersection A and the second intersection C on the second tooth motion curve. It should be noted that at least one error position B is herein set.

In the error calculating step (Step S7), the transmission error is calculated by subtracting a fluctuation error at the third intersection D from a fluctuation error at the error position B. In FIG. 9, the transmission error is, for instance, 0.0064 degrees.

Figure 10:
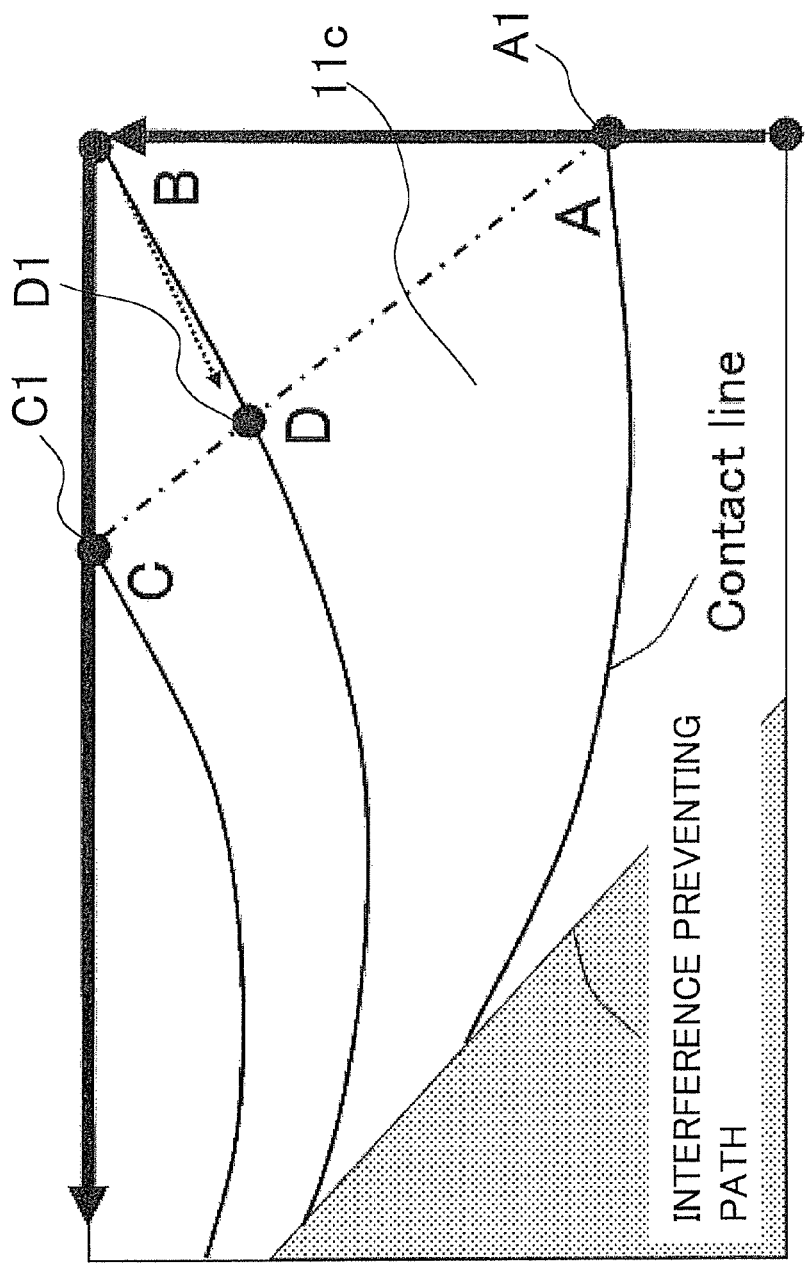
FIG. 10 is a schematic diagram of face gear tooth flanks representing the path of contact.

In the determining step (Step S8), a dashed dotted curve represented in FIG. 10 is determined as a path of contact on the outer edge of the tooth flank 11d of each face gear tooth 11c of the face gear 11. As shown in FIG. 10, the dashed dotted line connects at least three positions on the first tooth flank 11d of each face gear tooth 11c, and the three positions herein include a first contact position A1 of the pinion gear 12 in the first intersection A, a third contact position D1 of the pinion gear 12 in the third intersection D when the face gear 11 is rotated by the amount of a transmission error, and a second contact position C1 of the pinion gear 12 in the second intersection C. The error position B and the third intersection D are herein arranged on the same contact line. When the position of the third intersection D on the tooth flank is obtained by rotating the face gear 11 by the amount of a transmission error while being arranged together with the error position B on the same contact line, the fluctuation error is set to be constant from the first intersection A to the second intersection C via the third intersection D on a single tooth. Non-uniform rotation is thereby prevented.

It should be noted that the third intersection D is calculated between the first intersection A and the second intersection C for every predetermined rotational angle. In other words, a plurality of the third intersections D is herein calculated. Accordingly, a path of contact is determined at an arbitrary position. Further, the path of contact is determined on the outer peripheral side of the first tooth flank 11d as described above. However, the path of contact can be determined at any position on either the first tooth flank 11d or the second tooth flank 11e.

Contact Simulation of Face Gear Formed by Path of Contact

Figure 11:
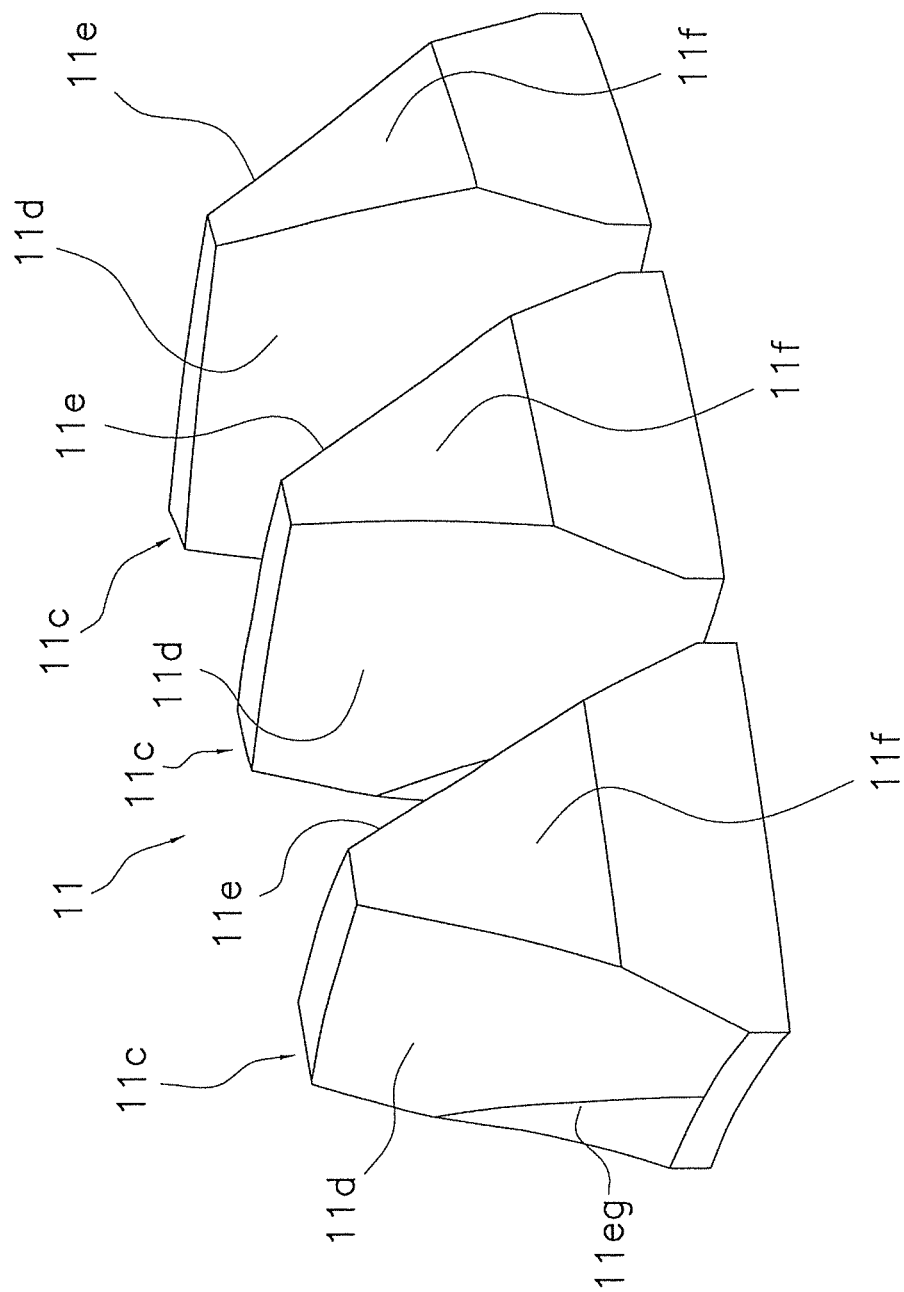
FIG. 11 is a schematic diagram illustrating a three dimensional (3D) model of a face gear processed along the path of contact by cutting.

FIG. 10 is a schematic diagram representing respective points on each first tooth flank 11d. The third intersection D represented in FIG. 9 is shifted from the outer end of each first tooth flank 11d to the inside of each first tooth flank 11d while being positioned substantially on the straight line connecting the first intersection A and the second intersection C. Another 3D model was herein created anew by cutting the aforementioned 3D model along the line connecting the first intersection A, the third intersection D and the second intersection C. Using the 3D model herein created, a simulation was executed regarding contact of the face gear 11 with the pinion gear 12. It should be noted that the simulation was executed only for each first tooth flank 11d functioning as a tooth flank in forward reel rotation. FIG. 11 illustrates the face gear teeth 11c of the face gear 11 in the 3D model used for the simulation. Each face gear tooth 11c includes a facet 11f on its outer peripheral surface between the first tooth flank 11d and the second tooth flank 11e. The facet 11f is cut and formed by the path of contact derived by the aforementioned method. The facet 11f is shaped by obliquely short-cutting one of the top corners of each face gear tooth 11c. Further, each first tooth flank 11d includes the aforementioned interference preventing path 11g on the inner edge portion thereof.

Figure 12:
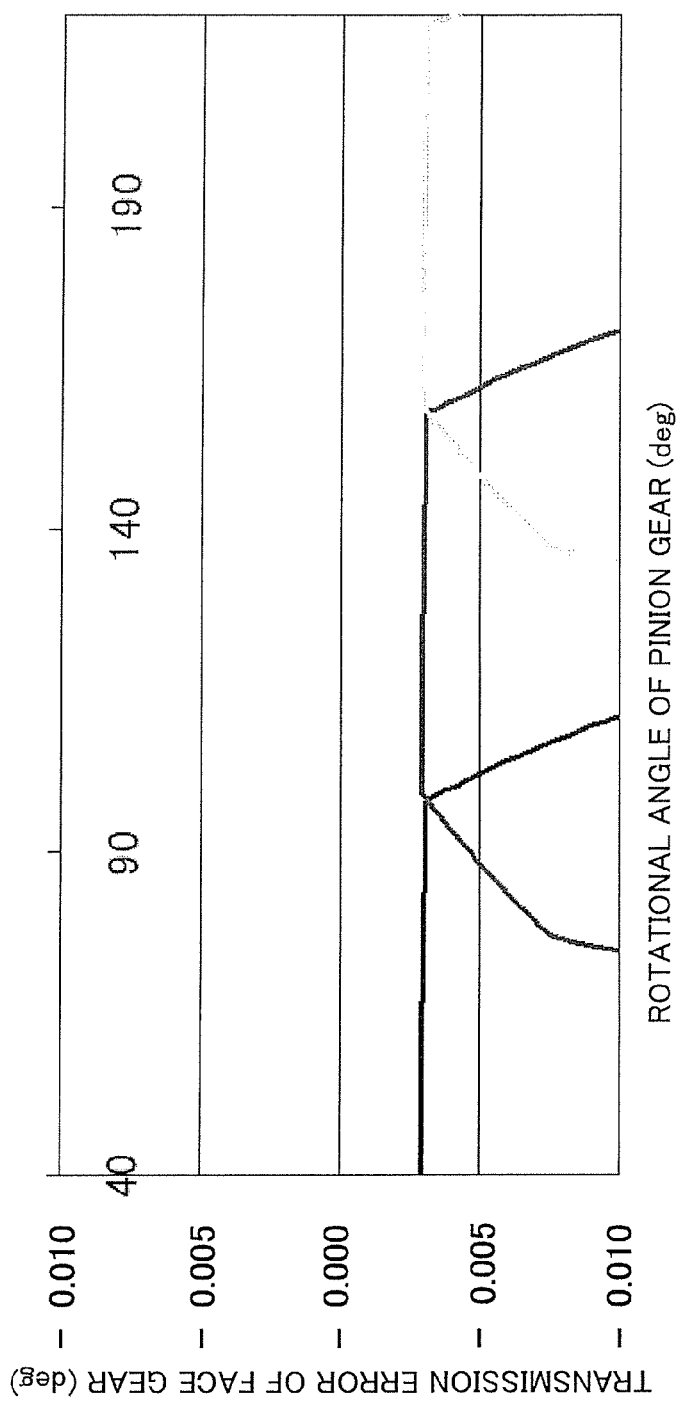
FIG. 12 is a chart representing motion curves (relationships) of the 3D model illustrated in FIG. 11 in the deep meshing state.

FIG. 12 herein represents motion curves (relationships) derived by the CAD simulation where the pinion gear 12 is meshed with the face gear 11 of the aforementioned 3D model in the deep meshing state. The motion curves represented in FIG. 12 are flatter and less fluctuating than those represented in FIG. 7. Thus, this indicates that non-uniform rotation is less caused by the face gear 11 including the facets 11f cut and formed along the path of contact.

The path of contact is set on the outer peripheral side of each first tooth flank 11d as described above. However, the path of contact can be set on either the outer peripheral side or the inner peripheral side of either each first tooth flank 11d or each second tooth flank 11e.

Figure 13:
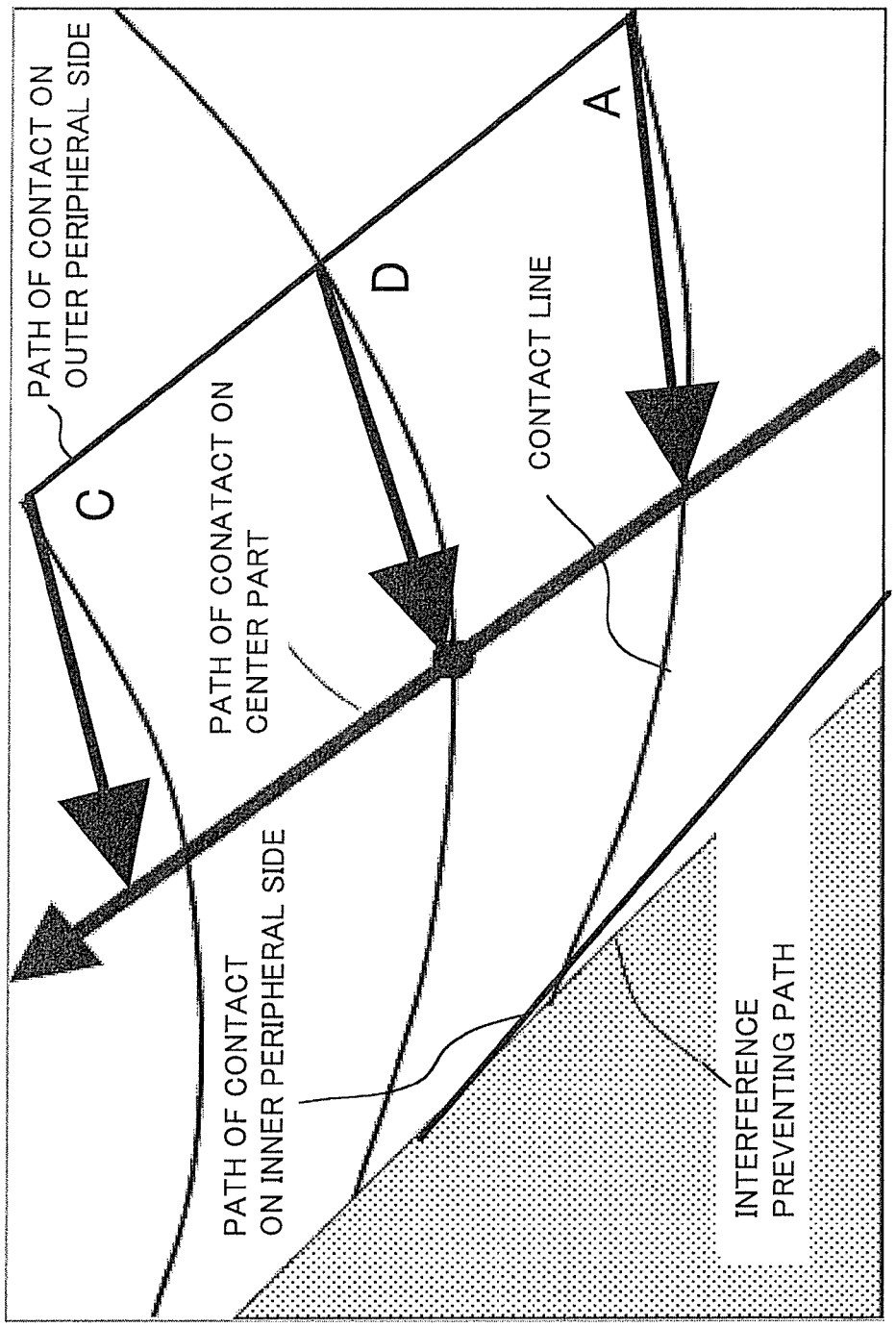
FIG. 13 is a schematic diagram representing the path of contact derived based on a direction of deriving a path of contact on the face gear tooth flanks.

When the aforementioned method is applied to the shallow meshing state represented in FIG. 6, the path of contact is set for obliquely short-cutting a corner between the interference preventing path and the inner peripheral side of each tooth flank as represented in FIG. 13.

Figure 14:
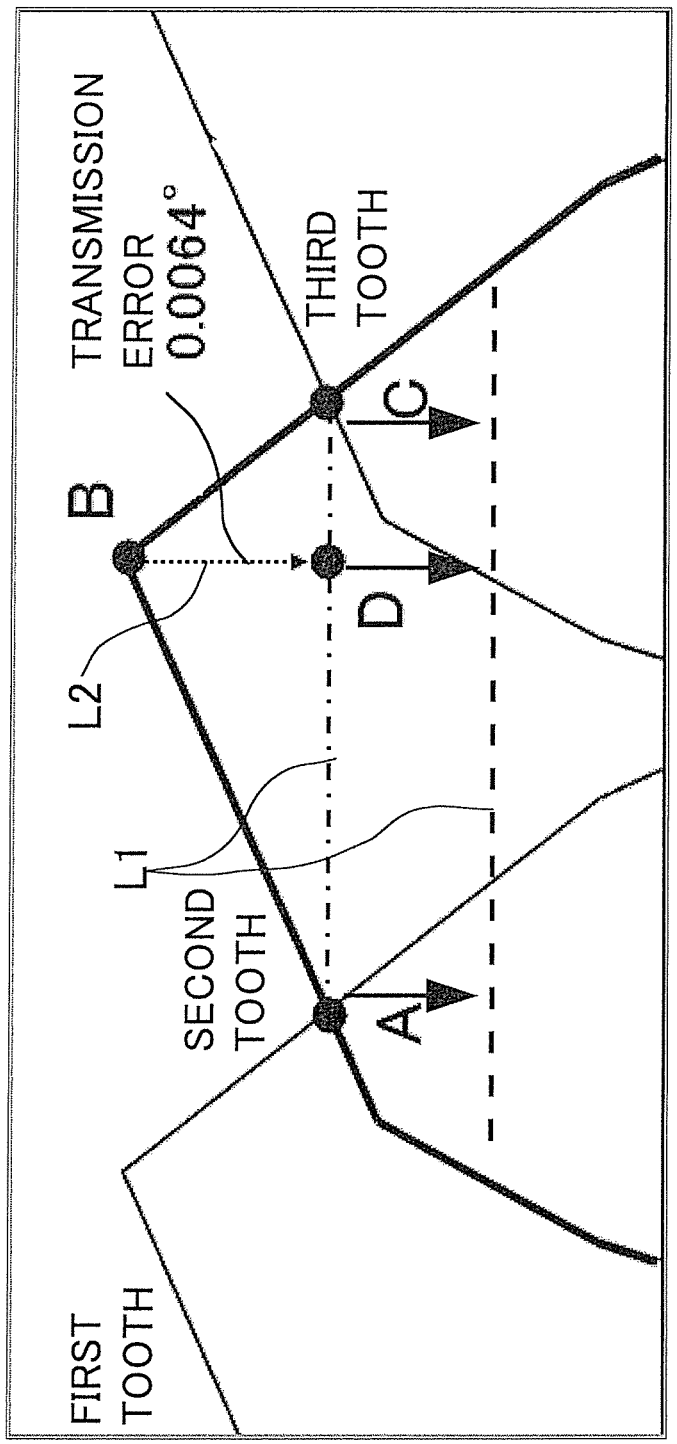
FIG. 14 is a schematic diagram representing a method of deriving the path of contact in the center of the tooth flanks.

In setting the path of contact in a position away from the outer/inner peripheral part towards the center part on each tooth flank, the first intersection A, the second intersection C and the third intersection D can be calculated in the deep meshing state by shifting the first straight line L1 on the motion curves in a direction of reducing a fluctuation error, as represented in FIG. 14. When the first to third intersections above calculated are applied to the chart represented in FIG. 13, the path of contact can be set on a position away from the outer edge towards the inner peripheral side on each first tooth flank 11d. FIG. 13 shows that the path of contact in the deep meshing state and in the shallow meshing state are matched when being respectively shifted and determined towards the center part on each tooth flank.

Verification of Assembly Error of 3D Model

Assembly errors of the rotor drive mechanism 5 were verified through a simulation using the face gear 11 of the aforementioned 3D model. Specifically, three assembly errors of a height error, an offset error and a tilt axis error were verified as illustrated in FIG. 15. Further, assembly errors were verified by comparing two 3D models. One of the 3D models is a conventional face gear with a theoretical shape, which is constructed by a model generating simulation. The other of the 3D models is a face gear with modified tooth flanks illustrated in FIG. 13. Specifically in the face gear of the latter 3D model, the path of contact is positioned in the center part on each tooth flank, and only the center part of each theoretical tooth flank is left while the both areas adjacent to the center part are prevented from making contact with the pinion gear. It should be noted that the simulation was conducted only for the first tooth flanks 11d functioning as the tooth flanks in the forward reel rotation.

Figure 17:
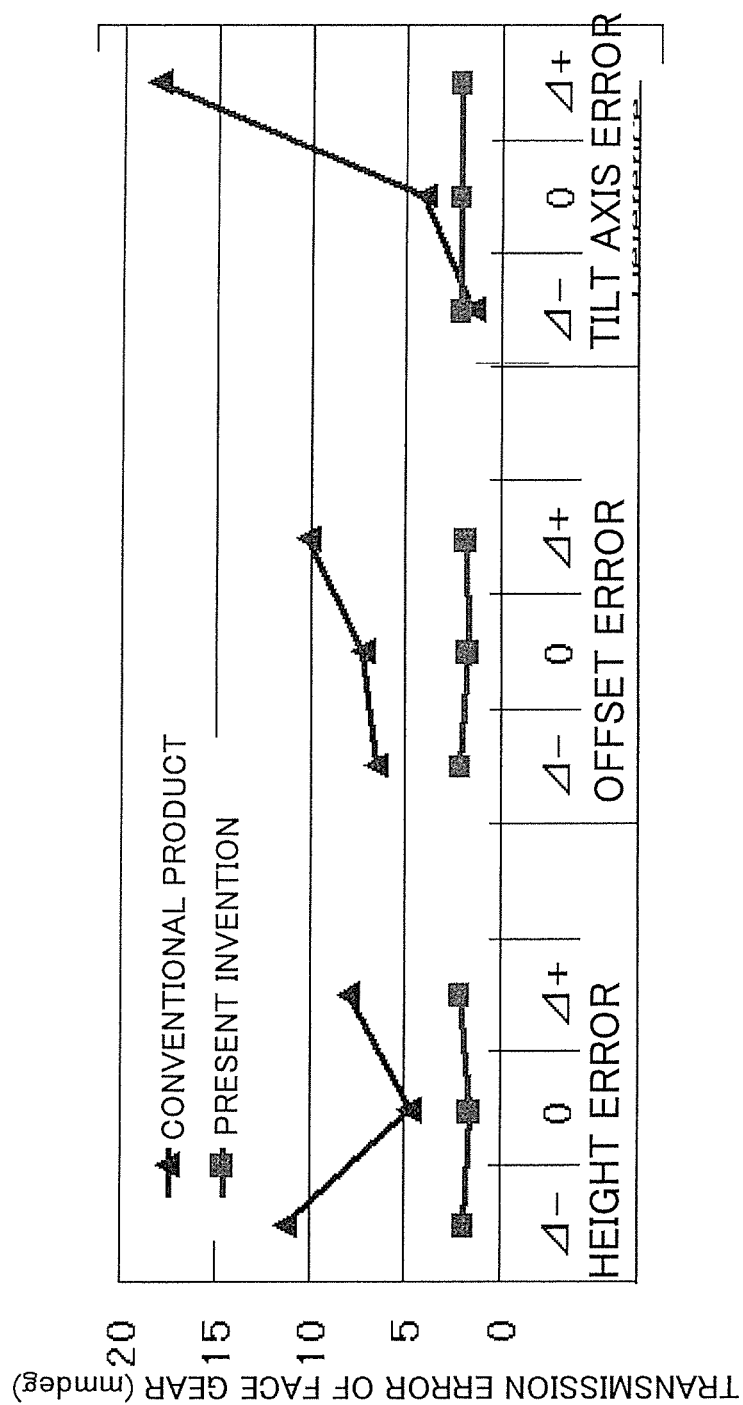
FIG. 17 is a comparative chart for the 3D model and the well-known product, representing simulation results of production of the rotational errors due to the alignment errors.

FIG. 15 illustrates definitions and directions of the assembly errors. Nine simulations were conducted for each error type using an orthogonal array that contains three factors and three levels. FIG. 16 represents a verification design of the orthogonal array, whereas FIG. 17 represents a simulation result. It was found that the assembly errors greatly affected the tooth flanks of the conventional product with a theoretical shape. In contrast, it was found that the assembly errors hardly affected the tooth flanks of the face gear 11 of the present exemplary embodiment based on the path of contact.

Processing and Measurement Result of Prototype

The tooth flank was formed for each gear tooth of the face gear 11 based on the aforementioned simulation. Specifically, the center part of each tooth flank is formed in a theoretical shape by disposing thereon the path of contact determined by the method of deriving a path of contact according to the present invention, while the both sides adjacent to the center part of each tooth flank are formed to avoid contact with the pinion gear 12. It should be noted that the outer peripheral edge is also formed to avoid contact with the pinion gear 12. In contrast, a face gear having the tooth flanks of a theoretical shape was created as an exemplary conventional product.

Using a 3D measuring instrument, accuracy was measured for both the face gear 11 of the present invention and the face gear of an exemplary conventional product. As a result, it was confirmed that all the tooth flanks had sufficient accuracy.

Figure 18:
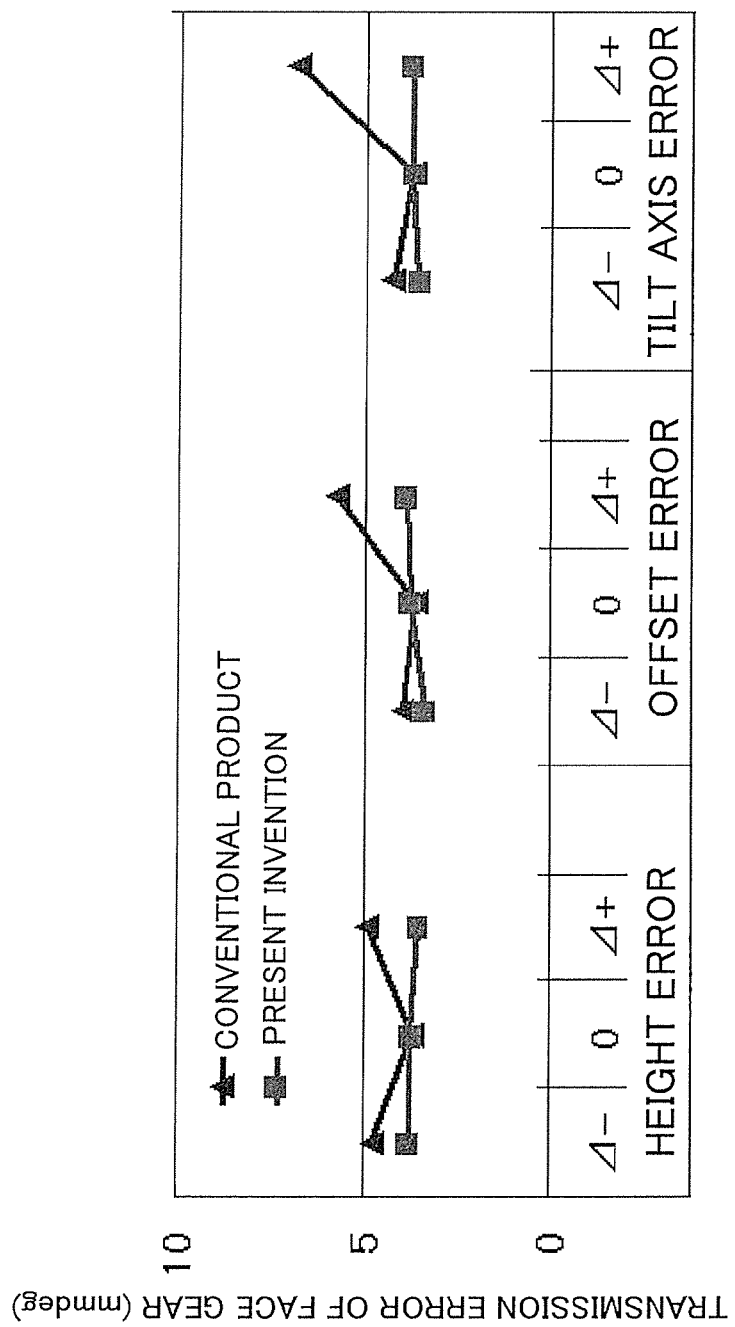
FIG. 18 is a comparative chart for the 3D model and the well-known product, representing measurement results of production of rotational errors due to the alignment errors.

A contact transmission error was measured for both of the above created face gears. The measuring instrument herein installed was an encoder configured to generate 1296000 pulses per revolution respectively for the driving side and the driven side. Under the condition, the advance/delay angles of two face gears were accurately measured by driving the pinion gear. Using a gear measuring instrument, accuracy was herein measured for the pinion gear for rotation. As a result of the measurement, it was confirmed that the pinion gear was finished in the level 5 of the new JIS (Japanese Industrial Standards). Similarly to the aforementioned simulation, the measurement of the contact transmission error was conducted nine times using an orthogonal array that contains three factors and three levels. FIG. 18 is a factorial effect chart of the measurement result of the first tooth flanks 11d where the vertical axis represents a contact transmission error per pitch as average of all the hear teeth.

Comparison between FIGS. 17 and 18 shows that the both results have roughly the same tendency although difference is confirmed in absolute values. It is herein noteworthy that the prototype face gear of the exemplary embodiment of the present invention, having the first tooth flanks 11d formed based on the path of contact, was hardly affected by the assembly errors similarly to the 3D model of the aforementioned simulation.

Figure 19:
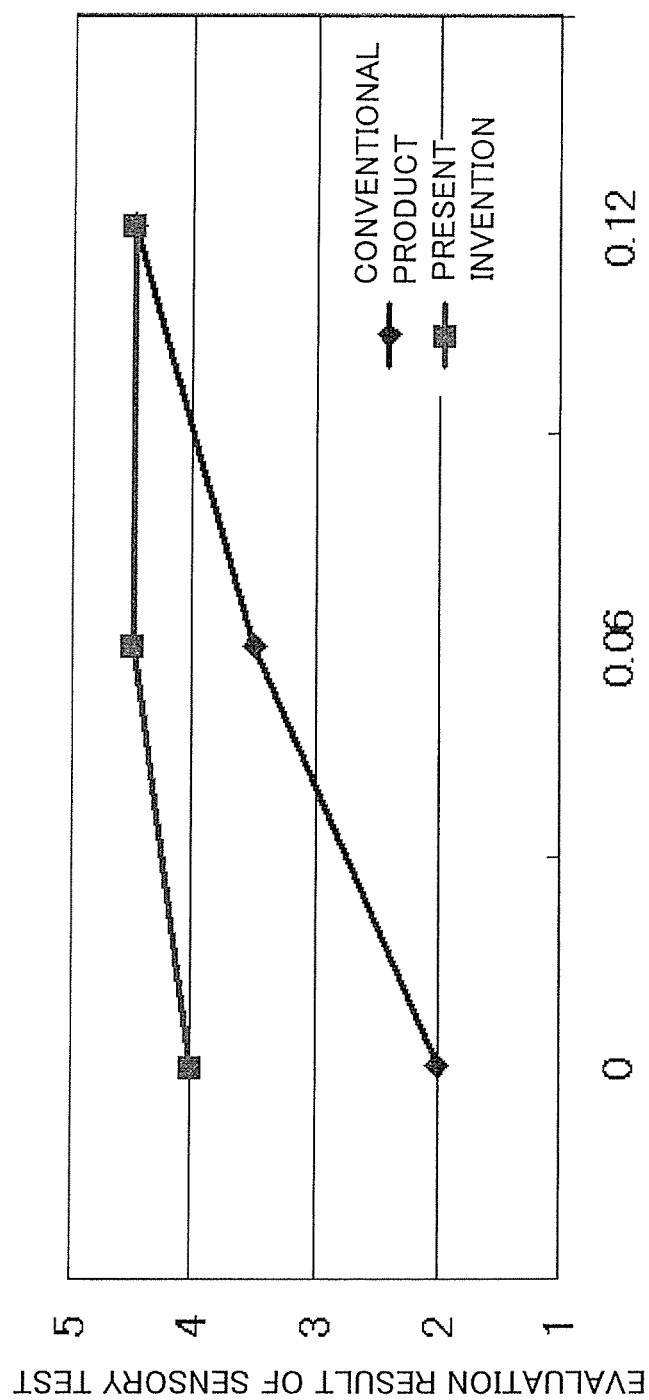
FIG. 19 is a chart representing results of sensory evaluations for a spinning reel embedded with a prototype and that embedded with the well-known product.

FIG. 19 represents a result of a sensory evaluation test regarding rotational feeling of a spinning reel that the face gear 11 of an exemplary embodiment of the present invention was actually incorporated. In the chart of FIG. 19, the vertical axis represents an evaluation result of the sensory test where a larger value indicates a better rotational feeling. On the other hand, the horizontal axis in the chart of FIG. 19 represents a clearance in the axial direction of the handle (i.e., a clearance in a contact height direction). The sensory evaluation test was conducted where three levels of clearance were set at intervals of 0.06 mm. It was also found from the result of the sensory evaluation test that the rotational feeling less fluctuated (i.e., non-uniform rotation was less caused) in the prototype of the present exemplary embodiment based on the path of contact.

The patch of contact on the face gear was derived and determined by the simulation using the CAD.

The first tooth flanks 11d of the face gear teeth 11c of the face gear 11 were created in the 3D simulation based on the determined path of contact and were further verified by the simulation. As a result, it was confirmed that the face gear 11 was less affected by three assembly errors of a contact height error, an offset error and a tilt axis error.

Evaluation was executed for the actually processed prototype face gear. The measurement result of the contact transmission error for the prototype face gear was similar to that for the face gear created in the simulation. Accordingly, an advantageous effect could be confirmed in the prototype face gear actually processed.

Measurement and test were conducted for the prototype face gear actually incorporated in the spinning reel. As a result, it was confirmed that the prototype face gear, having the tooth flanks formed based on the path of contact, was less affected by three assembly errors of a contact height error, an offset error and a tilt axis error similarly to the product created in the simulation. Accordingly, it was verified that non-uniform rotation due to the assembly errors could be eliminated and assembly could be easily performed in mass production.

Other Exemplary Embodiments

An exemplary embodiment of the present invention has been described above. However, the present invention is not necessarily limited to the aforementioned exemplary embodiment and a variety of changes can be herein made without departing from the scope of the present invention.

(a) In the aforementioned exemplary embodiment, the path of contact is disposed in the center part of each tooth flank. However, the path of contact can be disposed in any part of each tooth flank.

(b) In the aforementioned exemplary embodiment, the face gear for the spinning reel has been exemplified for explaining the present invention. However, the present invention is not limited to the face gear for the spinning reel. For example, the present invention can be applied to the other gears excluding the face gears, such as the bevel gears, the hypoid gears, and the helical gears. The present invention can be applied to all the gears meeting the application condition that the tooth flanks thereof are theoretical ones configured to change the way of contact with the paired gear from a line contact to a spot contact due to alignment errors and so forth.

(c) In the aforementioned exemplary embodiment, the center part and the outer edge of each tooth flank are formed along the path of contact. However, each tooth flank can be entirely formed along the path of contact.

(d) The present exemplary embodiment is intended to be applied to the spinning reels. Only the first tooth flanks 11d are thereby formed based on the path of contact because they are configured to be meshed with the teeth of the paired gear and receive a load in the fishing-line winding direction of the handle. However, the second tooth flanks 11e can be formed based on the path of contact for the case that the both directional rotations (i.e., the fishing-line winding direction and the fishing-line releasing direction) are transmitted to the face gear while a load is applied thereto and the case that a load is applied to the face gear when the send tooth flanks 11e make contact with the teeth of the paired gear.

What is claimed is:

1. A method of deriving a path of contact of a face gear including a plurality of gear teeth in meshing with a pinion gear, the method comprising:
   positioning the pinion gear for meshing with the face gear a prescribed reference contact position;
   shifting the pinion gear from the reference contact position either towards or away from the face gear along a rotational axis of the face gear;
   deriving a first relationship between a rotational angle of the pinion gear and a fluctuation error of a rotational angle of the face gear;
   deriving a second relationship between the rotational angle of the pinion gear and the fluctuation error by shifting the first relationship by subtracting from the rotational angle an angle of 360 degrees divided by the number of the gear teeth;
   deriving a third relationship between the rotational angle of the pinion gear and the fluctuation error by shifting the first relationship by adding to the rotational angle the angle of 360 degree divided by the number of the gear teeth;
   deriving a first point which the first and second relationships share and a second point which the first and third relationships share, the first point having a first fluctuation error, the second point having the first fluctuation error;
   deriving a third point, which has the first fluctuation error, between the first and second points; and
   determining a curve line connecting a first contact position, a second contact position, and a third contact position as the path of contact on tooth flanks of the gear teeth of the face gear,
   setting the first contact position as a contact position of the pinion gear and corresponding to the first point,
   setting the second contact position as a contact position of the pinion gear and corresponding to the second point,
   setting the third contact position as a contact position of the pinion gear and corresponding to the third point when the face gear is rotated for an angle for a rotational error.

2. The method of deriving the path of contact on the face gear according to claim 1, further comprising
   deriving a fourth point which has the first fluctuation error between the first and second points;
   calculating a rotational error for the fourth point by subtracting the fluctuation error of the third point from a fluctuation error of the fourth point; and
   determining the curve line connecting the first contact position, the second contact position, the third contact position, and a fourth contact position as the path of contact, the fourth contact position being set as a contact position of the pinion gear in the fourth point when the face gear is rotated for the angle for the rotational error for the fourth point.

3. The method of deriving the path of contact according to claim 1, wherein
   the method of deriving the curve path of contact is executed by a simulation by using an electronic computer.

4. A method of manufacturing a face gear, the method comprising:
   processing the tooth flanks of the gear teeth based on the path of contact according to claim 1.

5. A face gear including the tooth flanks processed based on the path of contact according to claim 4.

6. A spinning reel rotor drive device configured to transmit rotation of a handle shaft rotatably supported by a reel unit of a spinning reel to a rotor, comprising:
- the face gear according to claim 5 disposed onto the handle shaft in a unitarily rotatable state; and
- a pinion gear meshed with the face gear, the pinion gear disposed along a direction skew to the handle shaft, the pinion gear rotatably supported by the reel unit.

* * * * *